United States Patent
Blackwood et al.

(10) Patent No.: US 11,649,970 B2
(45) Date of Patent: May 16, 2023

(54) LIGHTING ASSEMBLY FOR AN OVER-THE-RANGE APPLIANCE

(71) Applicant: Haier US Appliance Solutions, Inc., Wilmington, DE (US)

(72) Inventors: Michael Blackwood, Louisville, KY (US); Jeff Donald Drake, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 205 days.

(21) Appl. No.: 16/953,504

(22) Filed: Nov. 20, 2020

(65) Prior Publication Data
US 2022/0163217 A1    May 26, 2022

(51) Int. Cl.
| | | |
|---|---|---|
| *F24C 15/20* | (2006.01) | |
| *H04N 7/18* | (2006.01) | |
| *F21V 3/00* | (2015.01) | |
| *H04N 23/54* | (2023.01) | |
| *F21Y 115/10* | (2016.01) | |

(52) U.S. Cl.
CPC ............... *F24C 15/20* (2013.01); *F21V 3/00* (2013.01); *F24C 15/2064* (2013.01); *H04N 7/183* (2013.01); *H04N 23/54* (2023.01); *F21Y 2115/10* (2016.08)

(58) Field of Classification Search
CPC ........ F21V 3/00; F21Y 2115/10; F24C 7/083; F24C 15/20; F24C 15/2064; H04N 5/2253; H04N 7/183
See application file for complete search history.

(56) References Cited

U.S. PATENT DOCUMENTS

| | | | | |
|---|---|---|---|---|
| 7,275,852 | B2* | 10/2007 | Kim | G02F 1/133608 |
| | | | | 362/609 |
| 9,182,112 | B2* | 11/2015 | Brown | F24C 15/008 |
| 9,441,810 | B2* | 9/2016 | Kennedy | F21V 7/041 |
| 10,041,687 | B1* | 8/2018 | Caneba | F24C 15/20 |
| 2019/0114935 | A1* | 4/2019 | Nolan | F24C 15/2064 |

FOREIGN PATENT DOCUMENTS

| | | |
|---|---|---|
| DE | 102014000573 A1 | 6/2015 |
| EP | 3051213 A1 | 8/2016 |
| JP | 2019/190770 A | 10/2019 |

* cited by examiner

*Primary Examiner* — Jason M Han
(74) *Attorney, Agent, or Firm* — Dority & Manning, P.A.

(57) ABSTRACT

An over-the-range appliance mountable over a cooktop appliance is provided. The over-the-range appliance includes a cabinet comprising a bottom panel defining a central aperture, a lighting box mounted within the central aperture. The lighting box defines a lighting recess and one or more light sources are mounted to the lighting box and are positioned within the lighting recess. A diffuser plate is positioned over the one or more light sources and encloses the lighting recess.

19 Claims, 5 Drawing Sheets

LIGHTING ASSEMBLY FOR AN OVER-THE-RANGE APPLIANCE

FIELD OF THE INVENTION

The present subject matter relates generally to over-the-range appliances, and more particularly to an over-the-range appliance having features for improved illumination of a cooktop appliance.

BACKGROUND OF THE INVENTION

Cooktop or range appliances generally include heating elements for heating cooking utensils, such as pots, pans, and griddles. A variety of configurations can be used for the heating elements located on the cooking surface of the cooktop. The number of heating elements or positions available for heating on the cooktop can include, for example, four, six, or more depending upon the intended application and preferences of the buyer. These heating elements can vary in size, location, and capability across the appliance.

Often, a separate appliance, such as a microwave oven appliance, a vent hood, or a kitchen hub, is mounted directly above a cooktop or range appliance. Appliances configured for this arrangement are generally referred to as over-the-range (OTR) appliances. These OTR appliances must typically contend with heat and exhaust (e.g., steam, smoke, etc.) generated by the cooktop or range appliance mounted below the OTR appliance. Some existing OTR appliances have vent systems for directing or motivating exhaust through the cabinet and out of an air outlet defined by an outer wall of the cabinet.

In addition, OTR appliances commonly include one or more light sources or cooktop lights directed toward the cooktop for illuminating the cooktop surface and cooking utensils placed thereon. However, conventional light sources direct a focused, high-intensity beam of light toward the cooktop, resulting in harsh lighting conditions that are undesirable to consumers. In addition, these appliances may include cameras for monitoring cooking processes and displaying images of the cooking process to a user of the appliance, and harsh lighting may lessen the image quality obtained by these cameras.

Accordingly, an OTR appliance with an improved lighting assembly would be desirable. More specifically, a lighting assembly for an OTR appliance that provides improved lighting with minimal reflections would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an over-the-range appliance mountable over a cooktop appliance is provided. The over-the-range appliance includes a cabinet comprising a bottom panel defining a central aperture, a lighting box mounted within the central aperture, the lighting box defining a lighting recess, one or more light sources mounted to the lighting box and being positioned within the lighting recess, a diffuser plate positioned over the one or more light sources and enclosing the lighting recess.

In another exemplary embodiment, a lighting assembly for an over-the-range appliance mountable over a cooktop appliance is provided. The over-the-range appliance includes a cabinet including a bottom panel defining a central aperture. The lighting assembly includes a lighting box mounted within the central aperture, the lighting box defining a lighting recess, one or more light sources mounted to the lighting box and being positioned within the lighting recess, and a diffuser plate positioned over the one or more light sources and enclosing the lighting recess.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
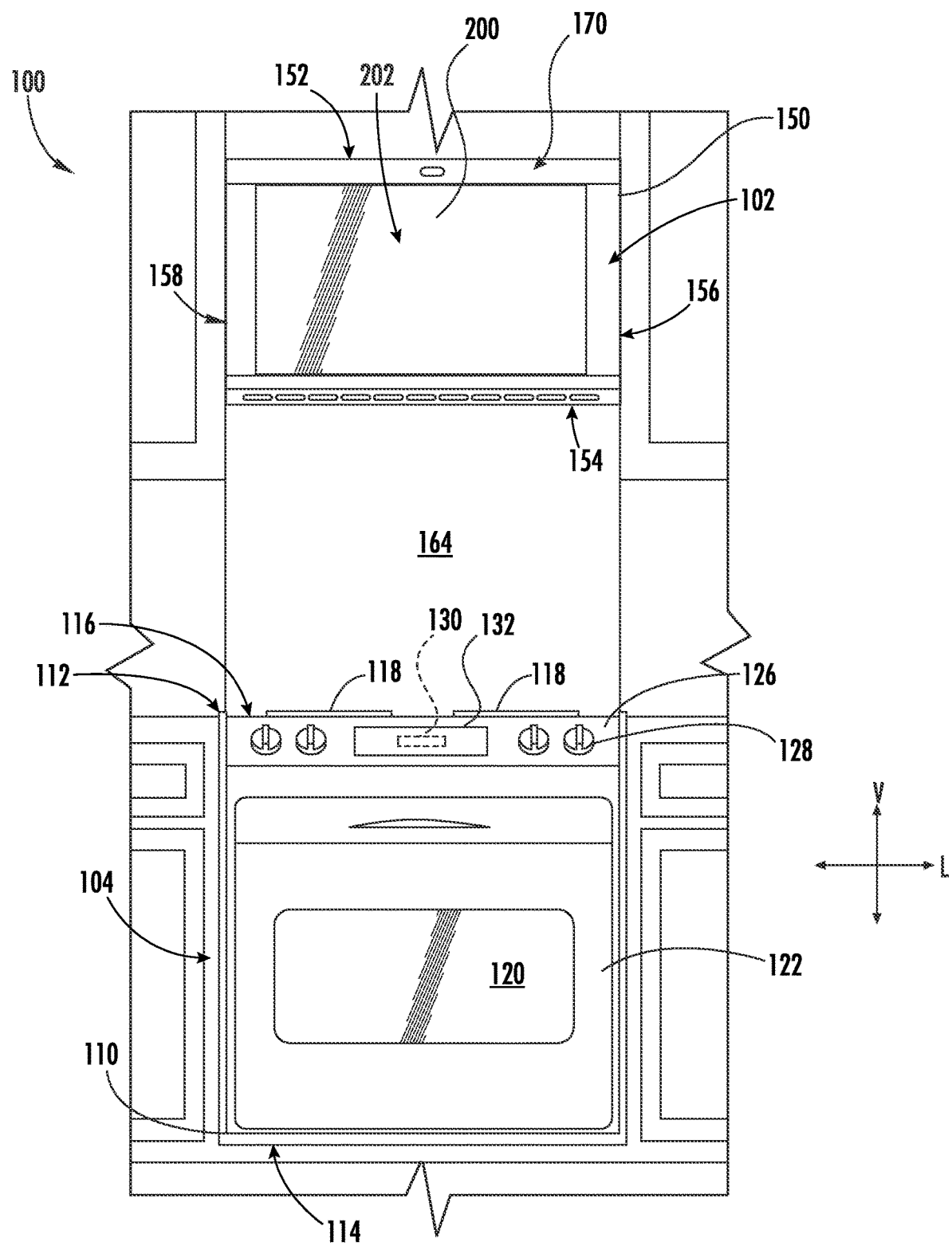
FIG. 1 provides a front view of a system, including an over-the-range appliance, according to exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
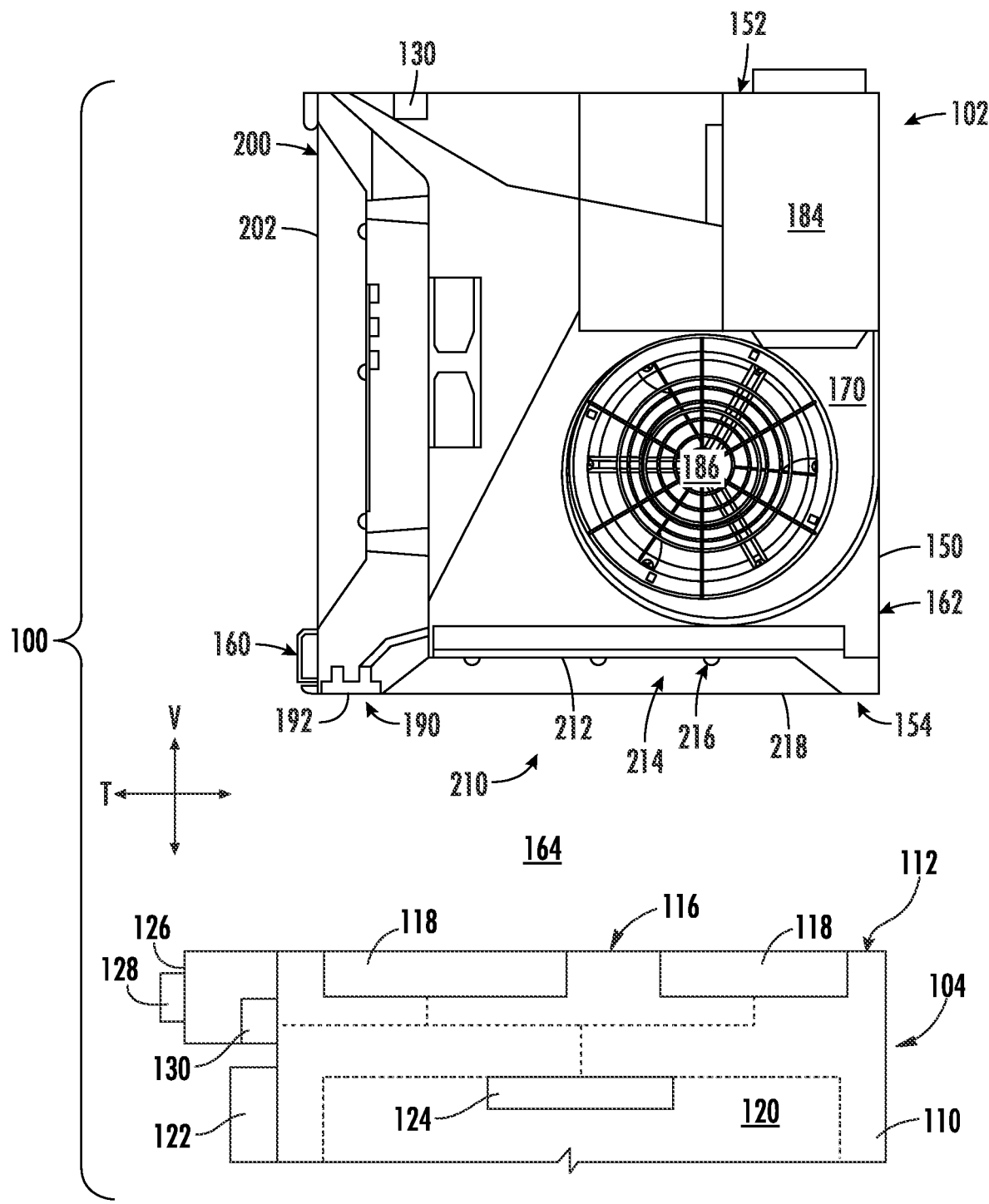
FIG. 2 provides a side schematic view of the exemplary system of FIG. 1.

Turning to the figures, FIGS. 1 and 2 provide various views of a system 100 according to exemplary embodiments of the present disclosure. System 100 generally includes an over-the-range (OTR) appliance 102 that can be positioned or mounted above a cooktop appliance 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner.

As shown in FIGS. 1 and 2, system 100 defines a vertical direction V, a lateral direction L, and a transverse direction T. The vertical, lateral, and transverse directions are mutually perpendicular and form an orthogonal direction system. As used herein, this coordinate system applies equally to both OTR appliance 102 and cooktop appliance 104 and will thus be used interchangeably to describe both appliances and their positions relative to each other.

Cooktop appliance 104 can include a chassis or cabinet 110 that extends along the vertical direction V between a top portion 112 and a bottom portion 114; along the lateral direction L between a left side portion and a right side portion; and along the traverse direction T between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material. Heating elements 118 may be various sizes and may employ any suitable method for heating or cooking an object, such as a cooking utensil (not shown), and its contents. In some embodiments, for example, heating element 118 uses a heat transfer method, such as electric coils or gas burners, to heat the cooking utensil. In other embodiments, however, heating element 118 uses an induction heating method to heat the cooking utensil directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 120 selectively covered by a door 122. One or more heating elements 124 (e.g., top broiling elements or bottom baking elements) may be enclosed within cabinet 110 to heat cooking chamber 120. Heating elements 124 within cooking chamber 120 may be provided as any suitable element for cooking the contents of cooking chamber 120, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 126 may be provided on cooktop appliance 104. Although shown at front portion of cooktop appliance 104, another suitable location or structure (e.g., a backsplash) for supporting user interface panel 126 may be provided in alternative embodiments. In some embodiments, user interface panel 126 includes input components or controls 128, such as one or more of a variety of electrical, mechanical, or electro-mechanical input devices. Controls 128 may include, for example, rotary dials, knobs, push buttons, and touch pads. A controller 130 is in communication with user interface panel 126 and controls 128 through which a user may select various operational features and modes and monitor progress of cooktop appliance 104. In additional or alternative embodiments, user interface panel 126 includes a display component 132, such as a digital or analog display in communication with a controller 130 and configured to provide operational feedback to a user. In certain embodiments, user interface panel 126 represents a general purpose I/O ("GPIO") device or functional block.

As shown, controller 130 is communicatively coupled (i.e., in operative communication) with user interface panel 126, controls 128, and display 132. Controller 130 may also be communicatively coupled with various operational components of cooktop appliance 104 as well, such as heating elements (e.g., 118, 124), sensors, etc. Input/output ("I/O") signals may be routed between controller 130 and the various operational components of cooktop appliance 104. Thus, controller 130 can selectively activate and operate these various components. Various components of cooktop appliance 104 are communicatively coupled with controller 130 via one or more communication lines such as, for example, conductive signal lines, shared communication busses, or wireless communications bands.

In some embodiments, controller 130 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 130 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 130 includes a network interface such that controller 130 can connect to and communicate over one or more networks with one or more network nodes. Controller 130 can also include one or more transmitting, receiving, or transceiving components for transmitting/receiving communications with other devices communicatively coupled with cooktop appliance 104. Additionally, or alternatively, one or more transmitting, receiving, or transceiving components can be located off board controller 130. Generally, controller 130 can be positioned in any suitable location throughout cooktop appliance 104. For example, controller 130 may be located proximate user interface panel 126 toward front portion of cooktop appliance 104. In optional embodiments, controller 130 is in operable communication with a controller 130 (described below) of OTR appliance 102 (e.g., through one or more wired or wireless channels).

As noted above, OTR appliance 102 may be positioned or mounted above cooktop appliance 104 (e.g., as a vent hood, microwave, kitchen hub, etc.). Specifically, a cabinet 150 of OTR appliance 102 may be positioned above cooktop appliance 104 along the vertical direction V. As shown, cabinet 150 of OTR appliance 102 includes a plurality of outer walls and when assembled, OTR appliance 102 generally extends along the vertical direction V between a top end 152 and a bottom end 154; along the lateral direction L between a first side end 156 and a second side end 158; and along the transverse direction T between a front end 160 and a rear end 162. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150.

According to the illustrated embodiment, OTR appliance 102 is configured as a kitchen hub and vent hood. In this regard, for example, OTR appliance 102 may include features for drawing in heat and/or exhaust generated by cooktop appliance 104. In addition, OTR appliance 102 may include one or more control panels or interactive displays for facilitating interaction between a user of system 100 with OTR appliance 102, oven appliance 104, or other appliances. Although OTR appliance 102 is described below according to an exemplary embodiment, it should be appreciated that variations and modifications may be made to OTR appliance 102 while remaining within the scope of the present subject matter. In addition, although OTR appliance 102 is described herein is being used with cooktop appliance 104 as part of system 100, it should be appreciated that OTR appliance 102 could alternatively be used in any other suitable cooking system or system of kitchen appliances.

Figure 3:
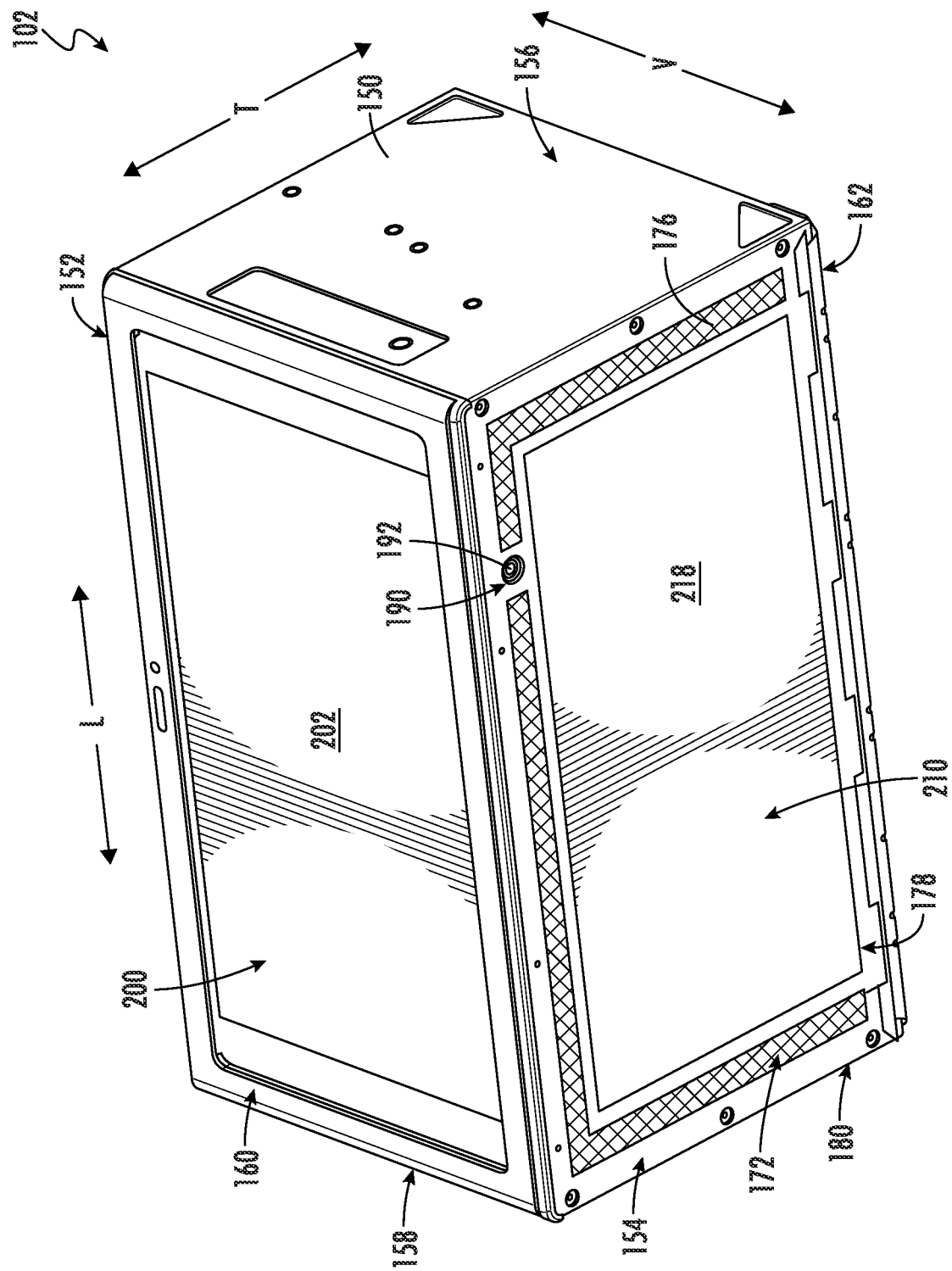
FIG. 3 provides a bottom, perspective view of exemplary over-the-range appliance of FIG. 1 according to exemplary embodiments of the present disclosure.
Figure 4:
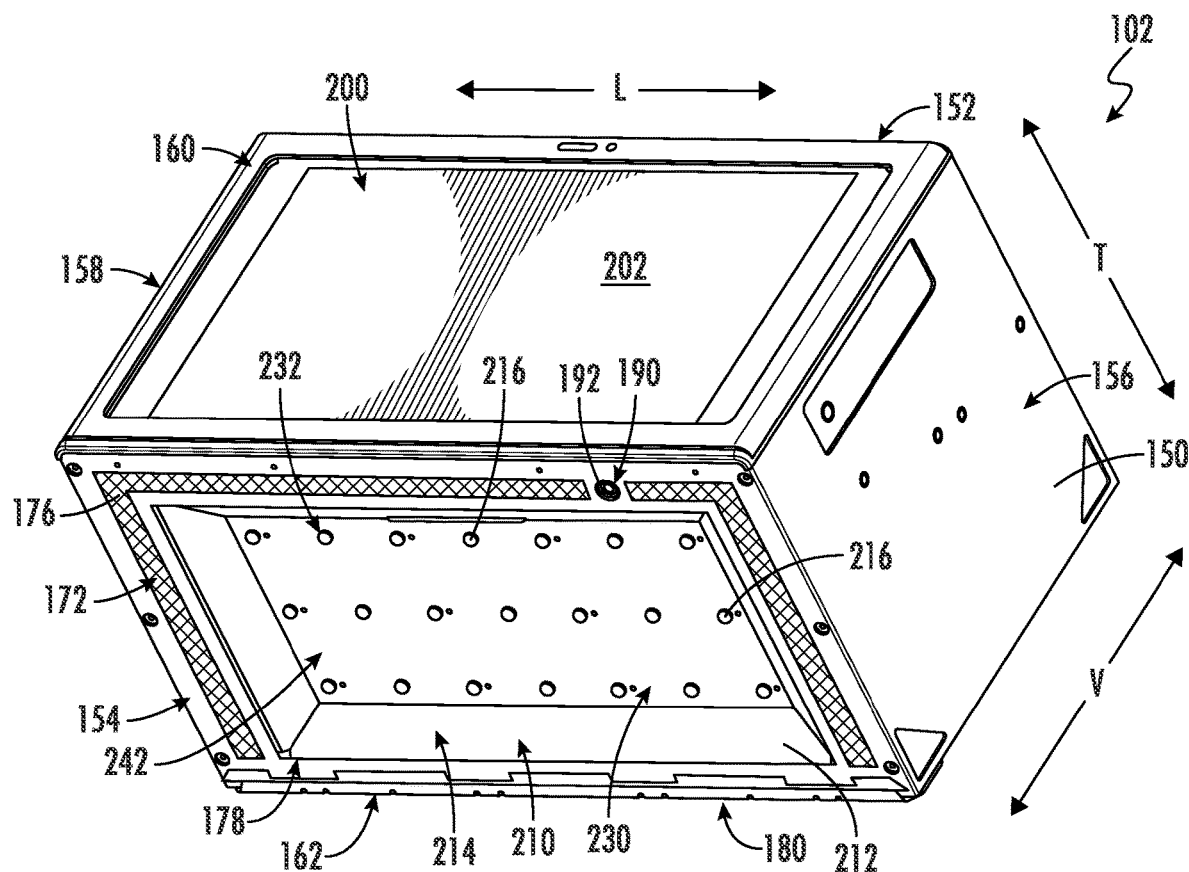
FIG. 4 provides a bottom, perspective view of exemplary over-the-range appliance of FIG. 1 with a light diffuser plate removed to reveal a lighting box according to exemplary embodiments of the present disclosure.
Figure 6:
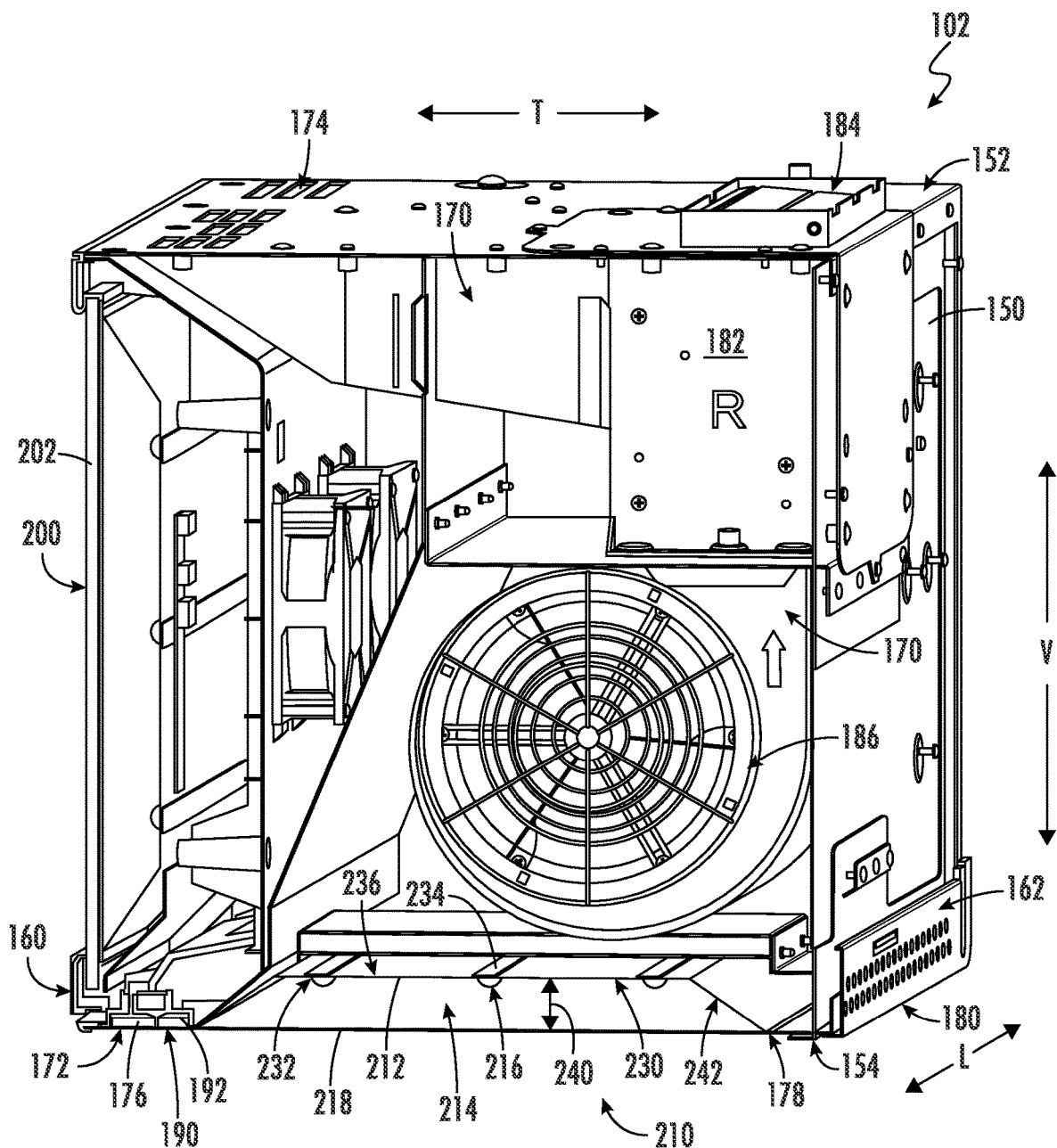
FIG. 6 provides a cross-sectional view of exemplary over-the-range appliance of FIG. 1 according to an exemplary embodiment of the present subject matter.

Referring now briefly to FIGS. 3, 4, and 6, in certain embodiments, a ventilation duct 170 is defined within cabinet 150. As shown, ventilation duct 170 may extend between an exhaust inlet 172 and an exhaust outlet 174 (e.g., through one or more external walls of cabinet 150). In some embodiments, exhaust inlet 172 is defined through cabinet 150 proximal to the bottom end 154 (e.g., through a bottom wall or directly above cooktop surface 116—FIG. 2). Specifically, as best shown in FIGS. 3 and 4, exhaust inlet 172 may include a plurality of intake vents 176 defined in bottom panel 154 of cabinet 150. More particularly, bottom panel 154 may define a central aperture 178 and intake vents 176 may be positioned around a perimeter 180 of bottom panel 154, e.g., such that intake vents 176 at least partially surround central aperture 178. Other positions of exhaust inlet 172 are possible and within the scope of the present subject matter.

According to exemplary embodiments, exhaust outlet 174 is defined through cabinet 150 proximal to the top end 152 (e.g., through a top wall of cabinet 150). According to exemplary embodiments, exhaust outlet 174 is positioned on top end 152 of cabinet 150 along the vertical direction V and toward a front end along the transverse direction T. Optionally, exhaust outlet 174 may include a plurality of exhaust apertures, louvers, or other flow directing feature. In addition, OTR appliance 102 may include an internal damper or diverter assembly 182 that is fluidly coupled to ventilation duct 170 and may direct the flow of exhaust air toward exhaust outlet 174 or to a separate vent hood outlet 184. In this regard, OTR appliance 102 may be fluidly coupled to a vent hood (not shown) and the user or installer of OTR appliance 102 may configure diverter assembly 182 to direct the flow of air out of vent hood outlet 184, as opposed to exhaust outlet 174. In this manner, a flow of exhaust air is discharged may be discharged out a top of OTR appliance 102 or through an external vent hood (not shown).

An exhaust air handler 186 may be mounted within ventilation duct 170. As would be understood, exhaust air handler 186 may be provided as any suitable blower or fan (e.g., radial fan, tangential fan, etc.) positioned within cabinet 150 to actively rotate or motivate air, steam, or exhaust fumes through ventilation duct 170. During use, the heat, steam, or exhaust fumes may be motivated by exhaust air handler 186 from open region 164 (FIG. 2) to ventilation duct 170 through exhaust inlet 172 into exhaust outlet 174 (or vent hood outlet 184).

Optionally, one or more filters (not pictured) may be provided at exhaust inlet 172 (e.g., between open region 164 and ventilation duct 170) to clean the air, steam, or exhaust fumes as it enters cabinet 150. For instance, a grease filter having a suitable coarse filter medium, such as a metallic mesh including aluminum or stainless steel, may be mounted across exhaust inlet 172. Additionally, or alternatively, an odor filter having a suitable fine filter medium, such as a mesh or block including activated carbon, may be mounted across exhaust inlet 172. Optionally, the odor filter may be positioned above or downstream from the grease filter.

Referring now specifically to FIGS. 2 and 3, OTR appliance 102 may further include a camera assembly 190 that is generally positioned and configured for obtaining images of cooktop appliance 104 during operation. Specifically, according to the illustrated embodiment, camera assembly 190 includes a camera 192 that is mounted to bottom end 154 of cabinet 150. Specifically, camera 192 is mounted to bottom panel 154 in front of central aperture 178 along the transverse direction T and between intake vents 176 such that is faces downward along the vertical direction V toward cooktop surface 116. In this manner, camera 192 can take images or video of a cooking utensil while positioned on heating element 118 and performing a cooking process. Although camera assembly 190 is illustrated as including a single camera 192 positioned over and configured for monitoring a single heating element 118 on cooktop surface 116, it should be appreciated that according to alternative embodiments, camera assembly 190 may include any suitable number, type, size, and configuration of camera(s) 192 for obtaining images of any suitable number and position of heating elements 118. For example, camera assembly 190 may include a plurality of cameras 192, each camera 192 being positioned for monitoring a cooking process being performed on a particular heating element 118.

According still other embodiments, camera assembly 190 may include features for adjusting the field-of-view and/or orientation of camera 192, such that a single camera 192 may be adjusted to monitor cooking operations being performed on more than one heating element 118. Notably, controller 130 of OTR appliance 102 (or any other suitable dedicated controller) may be communicatively coupled to camera assembly 190 and may be programmed or configured for analyzing the images obtained by camera assembly 190, e.g., in order to monitor the performance of a cooking cycle, transmit images or video to a display assembly, or provide the user with other useful information regarding a cooking process.

Referring now generally to FIGS. 1 through 4 and 6, OTR appliance 102 may include an interactive display assembly 200. According to the illustrated embodiment, interactive display 200 is mounted to cabinet 150 and defines substantially the entire front surface of OTR appliance 102. As illustrated, interactive display 200 extends along substantially the entire width of cabinet 150 along the lateral direction L and substantially along the entire height of cabinet 150 along the vertical direction V. According to the illustrated embodiment, interactive display 200 of includes a display or an image monitor 202 that is provided above cooktop surface 116 (e.g., along the vertical direction V). For instance, image monitor 202 may be mounted to or supported on cabinet 150 (e.g., directly above cooktop surface 116) proximal to the front side of cabinet 150.

Generally, image monitor 202 may be any suitable type of mechanism for visually presenting a digital (e.g., interactive) image. For example, image monitor 202 may be a liquid crystal display (LCD), a plasma display panel (PDP), a cathode ray tube (CRT) display, etc. Thus, image monitor 202 may be configured for displaying a digital image is presented or displayed as an optically-viewable picture (e.g., static image or dynamic video) to a user. As illustrated, the imaging monitor 202 generally faces, or is directed away from, cooktop surface 116. In particular, the image monitor 202 is directed toward the area forward from the cooktop appliance 104. During use, a user standing in front of cooktop appliance 104 may thus see the optically-viewable picture (e.g., recipe, dynamic video stream, graphical user interface, etc.) displayed at the image monitor 202.

The optically-viewable picture at the image monitor may correspond to any suitable signal or data received or stored by OTR appliance 102 (e.g., at controller 130). As an example, image monitor 202 may present recipe information in the form of viewable text or images. As another example, image monitor 202 may present a remotely captured image, such as a live (e.g., real-time) dynamic video stream received from a separate user or device. As yet another example, image monitor 202 may present a graphical user interface (GUI) (e.g., as part of user interface) that allows a user to select or manipulate various operational features of OTR appliance 102. During use of such GUI embodiments, a user may engage, select, or adjust the image presented at image monitor 202 through any suitable input, such as gesture controls detected through a camera assembly, voice controls detected through one or more microphones, associated touch panels (e.g., capacitance or resistance touch panels) or sensors overlaid across image monitor 202, etc. According to the illustrated embodiment, image monitor 202 is a tablet or touch screen display that extends an entire width and height of cabinet 150 and provides for an interactive experience to the user of OTR appliance 102.

Similar to cooktop appliance 104, OTR appliance 102 may include a controller 130 that facilitates operation of OTR appliance 102. Controller 130 may be mounted within cabinet 150, may be mounted within or be a part of image monitor 202, or may be positioned and integrated in any other suitable manner. In some embodiments, cooktop controller 130 is provided as or as part of OTR appliance controller 130. In alternative embodiments, cooktop controller 130 is a discrete unit in selective operable communication with OTR appliance controller 130 (e.g., through one or more wired or wireless channels). A detailed description of such components is omitted here for brevity.

Referring now specifically to FIGS. 3 through 6, a lighting assembly 210 that may be used with OTR appliance 102 will be described according to an exemplary embodiment of the present subject matter. In general, lighting assembly 210 is configured for illuminating cooktop appliance 104 during operation, e.g., for improved visibility both to a user and camera assembly 190. Although lighting assembly 210 is described herein according to an exemplary embodiment, it should be appreciated that variations and modifications may be made to lighting assembly 210 while remaining within the scope of the present subject matter.

As shown, lighting assembly 210 includes a lighting box 212 that is mounted within central aperture 178 of the bottom panel 154 of cabinet 150. In this regard, lighting box 212 is a rigid structure that defines a lighting recess 214 that is positioned within cabinet 150 when lighting box 212 is installed. Lighting assembly 210 may further include one or more light sources 216 that are mounted to lighting box 212 and are positioned within lighting recess 214. Lighting assembly 210 further includes a diffuser plate 218 that is positioned over the one or more light sources 216 and encloses the lighting recess 214. In general, diffuser plate 218 may be any suitable transparent or semitransparent feature for diffusing, directing, or otherwise transmitting light from a light source, such as light source 216 as described herein according to exemplary embodiments.

Notably, conventional lighting assemblies for over the range appliances include several discrete spotlights that each direct a single beam of light toward a particular location on cooktop surface 116. As a result, the reflections of each discrete beam of light provide for harsh lighting conditions and poor user visibility. Notably, the embodiment of lighting assembly 210 described herein includes diffuser plate 218 and other features for improving the dispersion of light generated by light sources 216 for better overall illumination and visibility of cooktop appliance 104.

Light sources 216 of lighting assembly 210 are generally configured for illuminating one or more surfaces of cooktop appliance 104. It should be appreciated that light sources 216 may include any suitable number, type, configuration, and orientation of light sources mounted at any suitable location to illuminate in any suitable colors, sizes, patterns, etc. In other words, light sources 216 may be provided as any suitable number, type, position, and configuration of electrical light source(s), using any suitable light technology and illuminating in any suitable color. For example, according to the illustrated embodiment, light sources 216 may include one or more light emitting diodes (LEDs), which may each illuminate in a single color (e.g., white LEDs), or which may each illuminate in multiple colors (e.g., multicolor or RGB LEDs) depending on the control signal from controller 130. However, it should be appreciated that according to alternative embodiments, light sources 216 may include any other suitable traditional light bulbs or sources, such as halogen bulbs, fluorescent bulbs, incandescent bulbs, glow bars, a fiber light source, etc.

According to the illustrated embodiment, diffuser plate 218 extends in a horizontal plane (e.g., a plane defined by the lateral direction L and the transverse direction T). In addition, diffuser plate 218 may be mounted to bottom panel 154 of cabinet 150, e.g., using any suitable mechanical fasteners, interference fit, mounting flanges, receiving slots, etc. According to the illustrated embodiment, when diffuser plate 218 is mounted to bottom panel 154, diffuser plate 218 sits flush with the bottom panel 154 of cabinet 150. In addition, it should be appreciated that diffuser plate 218 covers a relatively large portion of the total footprint of cabinet 150. In this regard, for example, the bottom panel 154 of cabinet 150 defines a footprint in the horizontal plane and diffuser plate 218 covers a total area that is greater than 50% of the footprint, greater than 60% of the footprint, greater than 70% of the footprint, greater than 80% of the footprint, or greater. In this manner, diffuser plate 218 provides a large, diffuse light source for illuminating cooktop surface 116 and an even manner.

Figure 5:
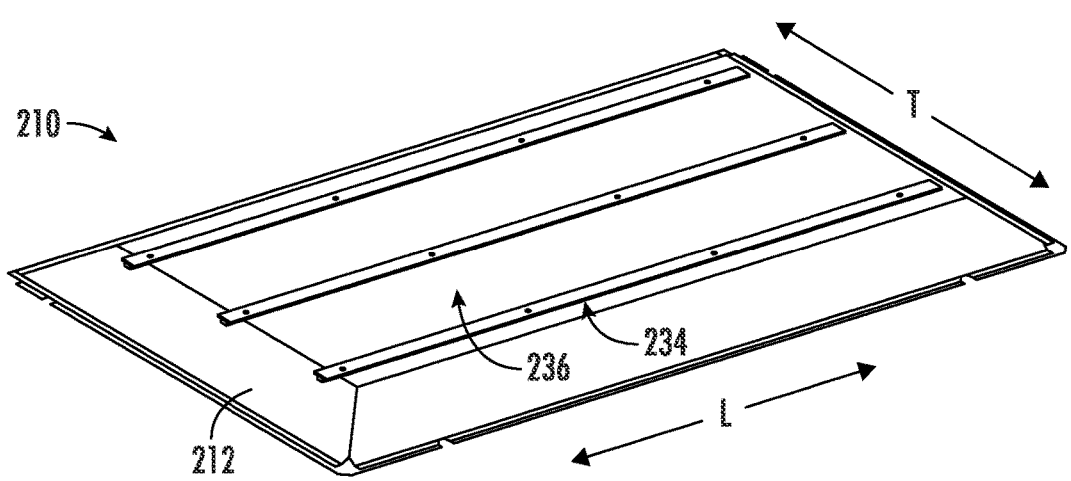
FIG. 5 provides a top, perspective view of the exemplary lighting box of FIG. 4 according to an exemplary embodiment of the present subject matter.

Referring now specifically to FIGS. 4 through 6, lighting box 212 may generally include a mounting surface 230 on which light sources 216 may be attached. Specifically, mounting surface 230 may define a plurality of apertures 232 through which light sources 216 may be inserted into lighting recess 214. Electrical connections for light sources 216 may be made behind mounting surface 230, e.g., within cabinet 150. More specifically, according to the illustrated embodiment, light sources 216 include a plurality of light strips 234 that are mounted to a backside 236 of lighting box 212. Each of the light strips 234 include a plurality of individual light sources 216 (e.g., light emitting diodes) that extend through apertures 232 into lighting recess 214. Moreover, each of these light sources 216 may be oriented toward diffuser plate 218, e.g., downward along the vertical direction V.

According to the illustrated embodiment, mounting surface 230 of lighting box 212 may be spaced apart from diffuser plate 218 by an illumination gap 240 measured along the vertical direction V. According to exemplary embodiments, illumination gap 240 is selected and sized such that light sources 216 are positioned at a suitable distance from diffuser plate 218 to ensure proper diffusion of light generated by light sources 216. According to exemplary embodiments, illumination gap 240 is greater than about 5 mm, greater than about 10 mm, greater than about 20 mm, greater than about 30 mm, greater than about 50 mm, or greater.

In addition, lighting box 212 may include a reflective panel or a reflective coating 242 that is positioned on an interior side of lighting box 212 (e.g., over mounting surface 230) and at least partially defines the lighting recess 214. In this manner, reflective coating 242 may further facilitate dispersion of light generated by light sources 216. The dispersed light may be projected onto diffuser plate 218 where it is diffused and spread over the entire cooktop surface 116. Notably, as mentioned above, the use of lighting assembly 210 for providing diffuse light over a cooktop appliance 104 provides for improved user visibility of cooktop surface 116 and improved imaging using camera assembly 190.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An over-the-range appliance mountable over a cooktop appliance, the over-the-range appliance comprising:
    a cabinet comprising a bottom panel defining a central aperture, wherein the bottom panel defines a footprint in a horizontal plane defined by a lateral direction and a transverse direction;
    a lighting box mounted within the central aperture, the lighting box defining a lighting recess;
    one or more light sources mounted to the lighting box and being positioned within the lighting recess; and
    a diffuser plate positioned over the one or more light sources and enclosing the lighting recess, wherein the diffuser plate covers over 60% of the footprint.

2. The over-the-range appliance of claim 1, wherein the lighting box comprises a reflective panel or a reflective coating that at least partially defines the lighting recess.

3. The over-the-range appliance of claim 1, wherein the diffuser plate extends in the horizontal plane.

4. The over-the-range appliance of claim 1, wherein the diffuser plate is mounted to the bottom panel of the cabinet.

5. The over-the-range appliance of claim 1, wherein the diffuser plate sits flush with the bottom panel of the cabinet.

6. The over-the-range appliance of claim 1, wherein the lighting box defines a mounting surface that is spaced apart from the diffuser plate by an illumination gap, the illumination gap being greater than about 20 millimeters.

7. The over-the-range appliance of claim 1, wherein the one or more light sources are oriented toward the diffuser plate.

8. The over-the-range appliance of claim 1, wherein the lighting box defines a plurality of apertures and wherein the one or more light sources comprises:
    a plurality of light strips mounted to a to a backside of the lighting box, each of the plurality of light strips including a plurality of light sources that extend through the plurality of apertures into the lighting recess.

9. The over-the-range appliance of claim 1, wherein the one or more light sources comprise light-emitting diodes.

10. The over-the-range appliance of claim 1, further comprising:
    a ventilation duct positioned within the cabinet and having one or more intake vents positioned at the bottom panel of the cabinet; and
    an air handler fluidly coupled to the ventilation duct for urging a flow of exhaust air through the one or more intake vents and the ventilation duct.

11. The over-the-range appliance of claim 10, wherein the one or more intake vents are defined around a perimeter of the bottom panel of the cabinet and surround the diffuser plate.

12. The over-the-range appliance of claim 1, further comprising:
    a camera assembly mounted to the bottom panel of the cabinet for obtaining images of the cooktop appliance.

13. The over-the-range appliance of claim 12, wherein the camera assembly comprises:
    a camera positioned in front of the diffuser plate along a transverse direction and being oriented toward a burner of the cooktop appliance.

14. The over-the-range appliance of claim 12, further comprising:
    a display assembly mounted to a front of the cabinet; and
    a controller operably coupled to the camera assembly and the display assembly, the controller being configured to:
    display one or more images obtained by the camera assembly on the display assembly.

15. A lighting assembly for an over-the-range appliance mountable over a cooktop appliance, the over-the-range appliance comprising a cabinet comprising a bottom panel defining a central aperture, wherein the bottom panel defines a footprint in a horizontal plane defined by a lateral direction and a transverse direction, the lighting assembly comprising:

a lighting box mounted within the central aperture, the lighting box defining a lighting recess;

one or more light sources mounted to the lighting box and being positioned within the lighting recess; and a diffuser plate positioned over the one or more light sources and enclosing the lighting recess, wherein the diffuser plate covers over 60% of the footprint.

16. The lighting assembly of claim 15, wherein the lighting box comprises a reflective panel or a reflective coating that at least partially defines the lighting recess.

17. The lighting assembly of claim 15, wherein the diffuser plate is mounted to the bottom panel of the cabinet and sits flush with the bottom panel of the cabinet.

18. The lighting assembly of claim 15, wherein the lighting box defines a plurality of apertures and wherein the one or more light sources comprises:

a plurality of light strips mounted to a to a backside of the lighting box, each of the plurality of light strips including a plurality of light sources that extend through the plurality of apertures into the lighting recess.

19. The lighting assembly of claim 15, wherein the over-the range appliance further comprises:

a camera assembly mounted to the bottom panel of the cabinet for obtaining images of the cooktop appliance;

a display assembly mounted to a front of the cabinet; and a controller operably coupled to the camera assembly and the display assembly, the controller being configured to:

display one or more images obtained by the camera assembly on the display assembly.

\* \* \* \* \*